United States Patent [19]

Jorgensen

[11] Patent Number: 5,728,973
[45] Date of Patent: Mar. 17, 1998

[54] KNOCKOUT ARRANGEMENT PROVIDING CONNECTION PATTERN CHOICE ON ELECTRICAL JUNCTION BOX AND COVER PLATE ARRANGEMENT FOR MOUNTING DYNAMIC LOADS

[75] Inventor: Robert W. Jorgensen, Niles, Mich.

[73] Assignee: Hubbell Incorporated, Orange, Conn.

[21] Appl. No.: 701,641

[22] Filed: Aug. 22, 1996

[51] Int. Cl.⁶ .................................................. H02G 3/10
[52] U.S. Cl. ................................................. 174/65 R
[58] Field of Search .............................. 174/65 R, 48, 174/49; 220/3.2, 3.8, 266

[56] References Cited

U.S. PATENT DOCUMENTS

| | | | |
|---|---|---|---|
| 946,646 | 1/1910 | Pratt | 174/65 R |
| 3,349,946 | 10/1967 | Lee | 220/3.2 |
| 3,369,071 | 2/1968 | Tuisku | 174/65 |
| 4,032,030 | 6/1977 | Bass et al. | 220/3.2 |
| 4,051,322 | 9/1977 | Park | 174/65 |
| 4,229,614 | 10/1980 | Smolik | 174/58 |
| 4,922,056 | 5/1990 | Larsson | 174/65 |
| 5,066,832 | 11/1991 | Clarey et al. | 174/50 |
| 5,191,171 | 3/1993 | Bordwell | 174/65 |
| 5,280,132 | 1/1994 | Clarey et al. | 174/50 |

FOREIGN PATENT DOCUMENTS

| | | | |
|---|---|---|---|
| 1254295 | 5/1989 | Canada | H05K 5/02 |

Primary Examiner—Kristine L. Kincaid
Assistant Examiner—Joseph Waks
Attorney, Agent, or Firm—Jerry M. Presson; Michael R. Swartz

[57] ABSTRACT

A knockout arrangement for an electrical junction box includes a housing having at least one side wall being substantially planar, a pair of spaced apart first knockout structures on the side wall with the first knockout structures defining a first circular knockout and a second annular knockout surrounding and containing the first circular knockout, the first and second knockouts having centers spaced apart such that the second knockout is defined in eccentric relation to the first knockout and the first and second knockouts of each knockout structure are adapted to be selectively removed to create a trade size opening for passage of a conduit of either of two sizes through the side wall, and a second knockout structure disposed on the side wall between and spaced apart from the first knockout structures and containing only the first knockout. The housing further has a plurality of the side walls with an opposing pair of the side walls having a plurality of spaced apart coplanar mounting ears respectively disposed adjacent opposite ends of the opposing side walls for attachment of a cover plate having corresponding mounting holes or slots to the housing for mounting of a dynamic load to the cover plate.

5 Claims, 2 Drawing Sheets

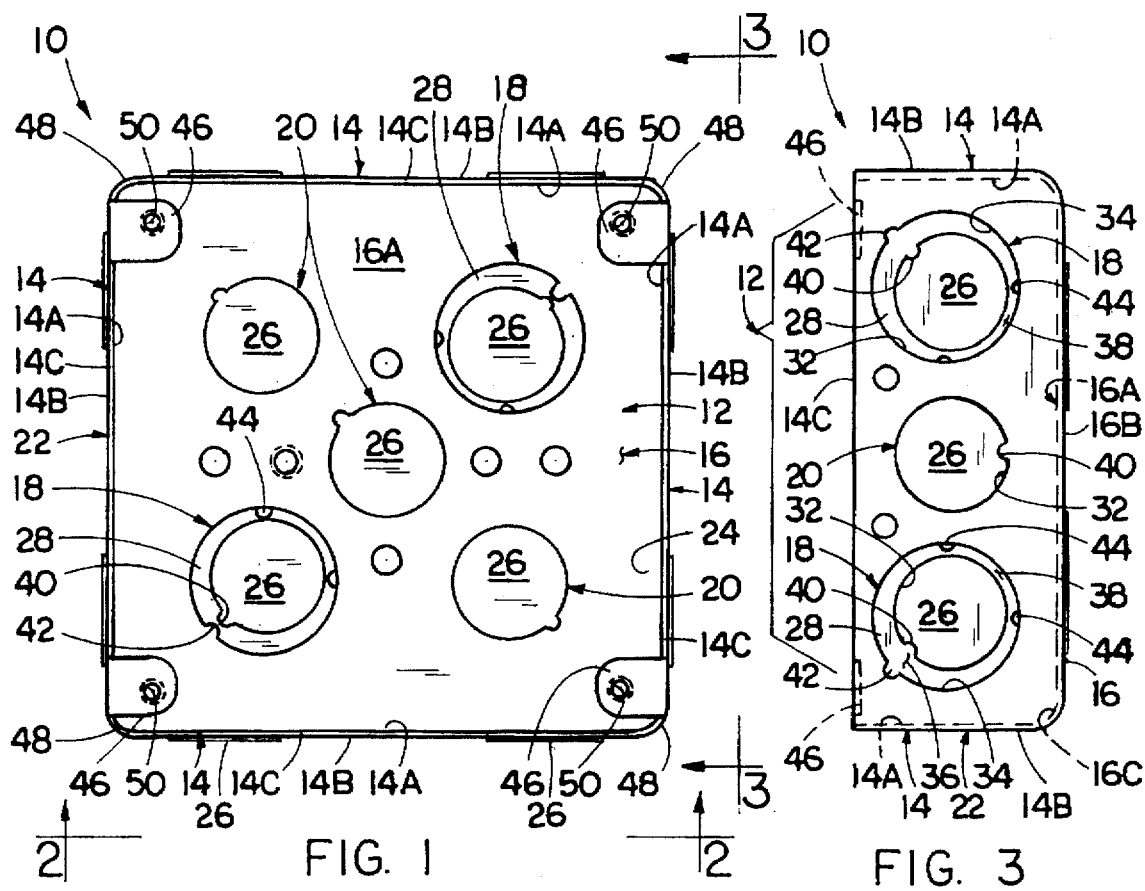
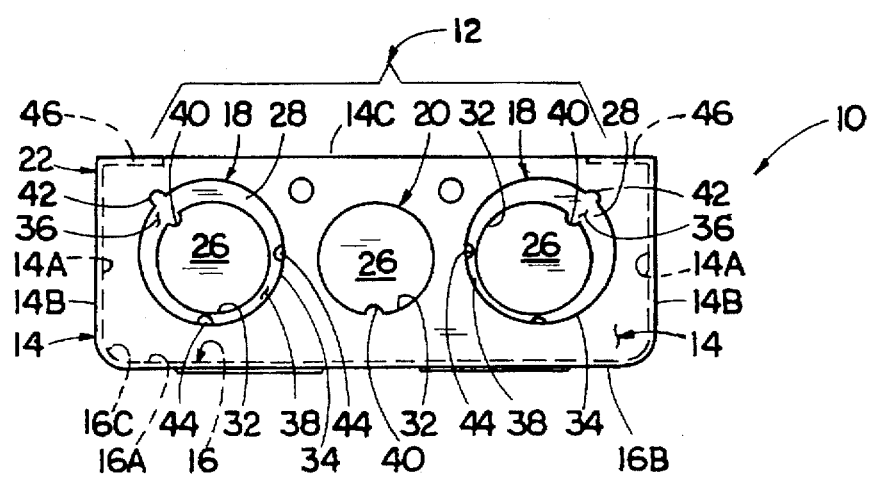

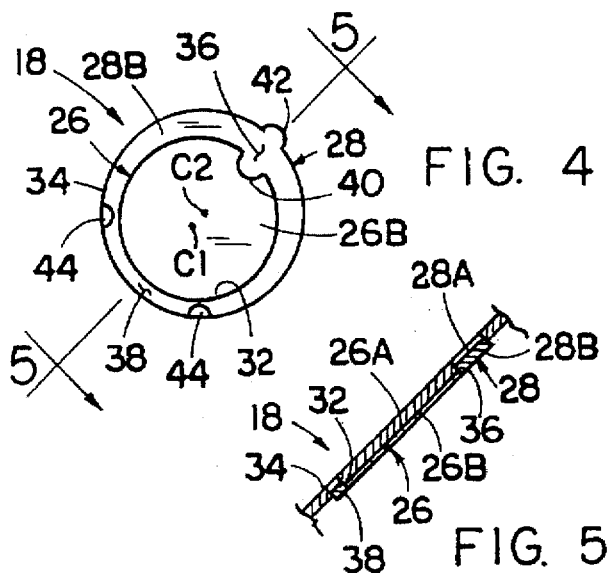
FIG. 4
FIG. 5
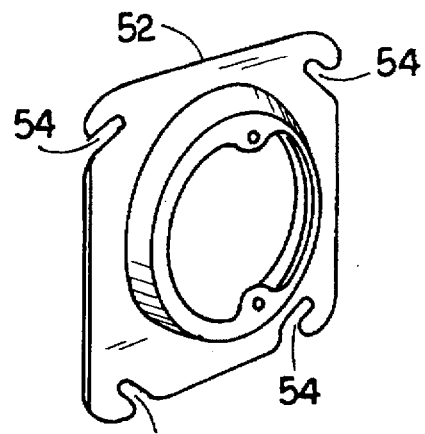
FIG. 6
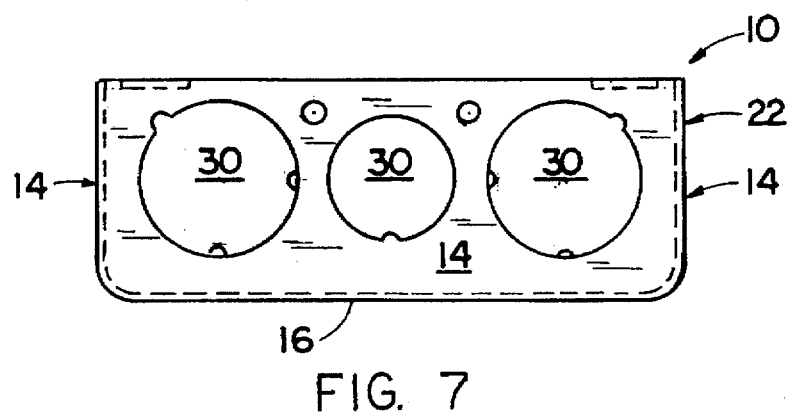
FIG. 7
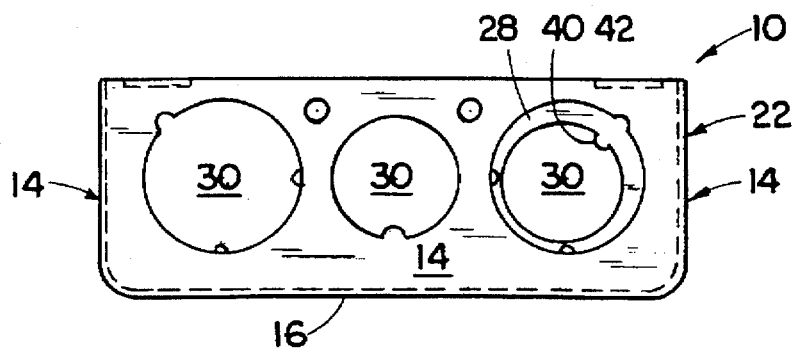
FIG. 8

KNOCKOUT ARRANGEMENT PROVIDING CONNECTION PATTERN CHOICE ON ELECTRICAL JUNCTION BOX AND COVER PLATE ARRANGEMENT FOR MOUNTING DYNAMIC LOADS

BACKGROUND OF THE INVENTION

1. Field of the Invention

The present invention generally relates to electrical boxes having conventional and eccentric knockouts for connections with either of two sizes of conduit and, more particularly, is concerned with an arrangement of knockouts providing greater connection pattern choice on an electrical junction box and for the attachment of a cover plate thereto for mounting of dynamic loads without regards to the specific orientation of the cover plate.

2. Description of the Prior Art

Electrical junction boxes have been designed with both conventional and eccentric knockouts for passage of electrical conduits having two different sizes. The conventional knockout generally has a diameter for accepting one-half inch trade size conduit while the eccentric knockout generally has a diameter for accepting three-quarter of an inch trade size conduit. The eccentric knockout is therefore larger in diameter and by definition does not share the same center point as the inner conventional knockout.

A variety of devices have been developed over the years which have conventional and/or eccentric knockouts. Representative examples of these devices are disclosed in U.S. Pat. No. 4,051,322 to Park et al., U.S. Pat. No. 4,229,614 to Smolik, U.S. Pat. No. 4,640,433 to Jorgensen et al., U.S. Pat. No. 5,191,171 to Bordwell and Canadian Patent. No. 1,254,295A to Hubbell, Inc. Most of the devices in the above-mentioned patents disclose electrical boxes having three knockouts on each of the side walls and five knockouts on the back wall. This knockout arrangement in the prior art appears to be a common practice in the field of electrical junction boxes. One problem with these prior art devices is that none of them appear to provide an electrical box which maximizes the number of conduit connection pattern choices.

Another problem with these prior art junction boxes is that they do not comply with the recently proposed NEC (National Electrical Code) change requiring fixture rated junction boxes to also be rated to support ceiling fans. Generally, two mounting holes may have been adequate for mounting static light fixtures, however, this is not adequate for the dynamic loads of ceiling fans. This is especially true if the fan is unbalanced and wobbles. Two points define a line and three will define a plane. Therefore, for ceiling fan rating, at least three (and preferably four) mounting holes/slots are essential for mounting the cover plate to the junction box so as to avoid introducing an axis that will allow a wobble that would tend to flex and break the mounting ears of the box.

Generally, all fixture support covers or cover plates are attached to the junction box with two and only two mounting screws even though the cover plates normally have four mounting holes/slots. This is chiefly due to two reasons. First, a majority of the boxes only have two mounting ears even though the cover plates have four mounting holes or slots and thus two diagonal mounting holes or slots are used. If the cover plate is rotated ninety degrees then the other two mounting holes/slots will align with the mounting ears for attachment of the cover plate. And secondly, in those situations where four mounting ears are formed or provided on the junction box, only two of the mounting ears are usable because the other two mounting ears never align with the cover plate mounting holes or slots regardless of the orientation of the cover plate.

Consequently, a need exists for a junction box having an arrangement of knockouts which overcomes the aforementioned problem in the prior art devices without introducing any new problems in place thereof and one having four mounting ears so arranged such that all four holes/slots of a cover plate will be in alignment with the four mounting ears regardless of the specific orientation of the cover plate.

SUMMARY OF THE INVENTION

The present invention provides an electrical junction box designed with arrangement of knockouts enabling greater pattern choice for connection of different size conduits and for the attaching of a cover plate across the open face of the junction box for mounting of a dynamic load thereto to satisfy the aforementioned needs.

The knockout arrangement of the present invention includes both the conventional one-half inch trade size knockout and the eccentric three-quarters of an inch trade size knockout. The knockouts are arranged in such a way and on an electrical box of a certain size so as to maximize the electrical connection pattern choices on the box and thereby to reduce the overall number of boxes which would otherwise be required without the present invention. And the mounting arrangement for attaching a cover plate to the box includes the provision of four mounting ears so arranged on the box to align and register with four corresponding holes or slots in the cover plate without regards to the specific orientation of the cover plate such that the cover plate can be securely attached to the box with four fasteners to prevent a degree of wobbling that would tend to flex and break the attachment of the mounting ears to the box when a dynamic load, such as a ceiling fan, is mounted to the cover plate.

Accordingly, the present invention is directed to a knockout arrangement for an electrical junction box and means for attaching a cover plate, without regards to its orientation, to the junction box in such a manner that a dynamic load can be mounted on the cover plate. The knockout arrangement comprises: (a) a housing having at least one side wall being substantially planar; (b) a pair of spaced apart first knockout structures on the side wall, each first knockout structure defining a first circular knockout and a second annular knockout surrounding the first circular knockout, the first and second knockouts having centers spaced apart such that the second knockout is defined in eccentric relation to the first knockout whereby the first and second knockouts of each first knockout structure can be selectively removed to create an opening for receiving a conduit of either of two sizes; and (c) a second knockout structure disposed on the side wall and spaced from the first knockout structures and containing only the first knockout. The housing preferably includes a plurality of side walls each being connected to a back wall at a periphery thereof and extending outwardly from and in substantially perpendicular relation to the back wall with the side walls being substantially planar and having opposite inner and outer surfaces with a forward edge defining a planar front housing opening. The back wall likewise is substantially planar and has opposite inner and outer surfaces. As an example, each side wall is about four and a quarter inches in length.

Furthermore, the first and second knockouts are respectively defined by areas of weakness along first and second substantially circular punch lines. The first punch line is completely contained within and spaced from the second punch line. For example, the first punch line has a first diameter for receiving a one-half inch trade size conduit while the second punch line has a second diameter for receiving a three-quarter of an inch trade size conduit. The openings created upon removal of the first and second knockouts along the first and second punch lines are for receiving conduits having diameters of about one-half inch and three-quarters of an inch.

The second knockout of each first knockout structure further includes regions of maximum width and regions of minimum width on opposite sides of the first knockout along a diameter of the second knockout. The first knockout has a first bridge member which interrupts the first punch line and constitutes the sole junction between the first knockout and the second knockout in each first knockout structure and constitutes the sole junction between the first knockout and each of the walls of the housing in each second knockout structure. The second knockout has a second bridge member which interrupts the second punch line and constitutes the sole junction between the second knockout and each of the walls of the housing in each first knockout structure. The bridge members help retain the first and second knockouts on the walls so as to prevent premature removal thereof.

Also, the plurality of side walls of the housing include a pair of opposing side walls spaced apart and facing toward one another. And for attaching the cover plate to the housing for supporting a dynamic load from the cover plate, each of the opposing side walls has a pair of mounting ears attached to the forward edge thereof. Each of the mounting ears is disposed adjacent to one of a pair of opposite ends of each one of the opposing side walls. The mounting ears on one of the opposing side walls are aligned across from and extend toward and in a common plane with the mounting ears on the other of the opposing side walls. Furthermore, each of the mounting ears extends in substantially perpendicular relation to each forward edge of the opposing side walls and further extend toward one another. Each mounting ear has an aperture for receiving a fastener therethrough for fastening a cover plate to the housing. Also, the apertures of the mounting ears are symmetrical about two axes so that a cover plate having the corresponding mounting holes or slots will align with the apertures of the mounting ears without regard to the specific orientation of the cover plate. The arrangement of the mounting ears and respective apertures in the present invention is adapted to support a cover plate for mounting dynamic loads such as a ceiling fan.

Finally, the four and one-quarter inch per side wall dimension of the housing of the electrical junction box of the present invention allows the necessary space and clearance for two three-quarters of an inch trade size knockouts and one one-half inch trade size knockout. This four and one-quarter inch per side wall dimension is the smallest practical size for this knockout arrangement. The arrangement of the knockouts in the present invention maximizes the conduit pattern choices thereon so that only one box need be manufactured to provide conduit pattern options which would otherwise require six different boxes to be made therefor of the prior art industry standard boxes.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front elevational view of an electrical junction box with a knockout arrangement of the present invention incorporated therein.

FIG. 2 is a side elevational view of the electrical junction box taken along line 2—2 of FIG. 1.

FIG. 3 is a side elevational view taken along line 3—3 of FIG. 1.

FIG. 4 is a front elevational view of a first knockout structure of the knockout arrangement of the present invention.

FIG. 5 is a cross-sectional view of the first knockout structure taken along line 5—5 of FIG. 4.

FIG. 6 is a front perspective view of a cover plate for attachment across the open front side of the electrical junction box of the present invention and for mounting an electrical device, such as a ceiling fan, on a front side of the cover plate.

FIG. 7 is a side elevational view of the electrical junction box showing one first and two second knockouts of first and second knockout structures of the knockout arrangement punched out.

FIG. 8 is a side elevational view of the electrical junction box showing two first and one second knockouts of the first and second knockout structures of the knockout arrangement punched out.

DETAILED DESCRIPTION OF THE INVENTION

Referring now to the drawings and particularly to FIGS. 1 to 3, there is illustrated a knockout arrangement for an electrical junction box, generally designated 10, of the present invention. Basically, the box 10 includes a knockout arrangement 12 on at least one side wall 14, and preferably, on a back wall 16 and on a plurality of side walls 14 thereof. The knockout arrangement 12 includes first and second knockout structures 18, 20 with the knockout structures 18 being spaced apart and preferably with the knockout structure 20 being spaced between the knockout structures 18.

The electrical junction box 10 includes a housing 22 formed by a plurality of the side walls 14 each being substantially planar and having opposite inner and outer surfaces 14A, 14B. The back wall 16 also is substantially planar and has opposite inner and outer surfaces 16A, 16B. The plurality of side walls 14 are each connected to one another at their opposite ends and connected to the back wall 16 at a periphery 16C thereof. Each of the side walls 14 extends outwardly in substantially perpendicular relation from the back wall 16 to a forward edge 14C defining a planar front housing opening 24. Preferably, the back wall 16 of the housing 22 is substantially square in shape and each side wall 14 has a length of about four and a quarter inches. The advantage created by the side walls 14 being of this particular length will be discussed in more detail below, but it is sufficient to say at this point that the four and one-quarter inch length of each side wall 14 combined with the knockout arrangement 12 enables one box 10 to have the same number of knockout pattern choices as six of the electrical boxes in the prior art, three having side wall lengths of four inches and three having side wall lengths of four and eleven-sixteenths inches. The box 10 of the present invention is preferably made of a suitable metal material.

More particularly, with reference to FIGS. 1 to 5, 7 and 8, the knockout arrangement 12 includes a pair of spaced apart first knockout structures 18 and a second knockout structure 20 spaced from and disposed between the pair of first knockout structures 18. The first knockout structure 18 defines a first circular knockout 26 having opposite inner and outer surfaces 26A, 26B and a second annular knockout 28 surrounding the first circular knockout 26 and having opposite inner and outer surfaces 28A, 28B. The opposite inner and outer surfaces 26A, 26B and 28A, 28B of the first and second knockouts 26, 28 may be, but need not be, offset from the planes containing one or the other surfaces and may be, but need not be, offset from the planes containing the opposite inner and outer surfaces 14A, 14B and 16A, 16B of each of the walls 14, 16 of the housing 22. As seen in FIG. 4, the first and second knockouts 26, 28 have respective centers C1 and C2 being spaced apart such that the second knockout 28 is defined in eccentric relation to the first knockout 26. The second knockout structure 20 contains only the first knockout 26. Additionally, as seen in FIG. 1, the back wall 16 may also have a pair of additional second knockout structures 20 (knockouts 26) spaced on opposite sides of the one second knockout structure 20 which is disposed between the first knockout structures 18. Furthermore, the first and second knockouts 26, 28 of each knockout structure 18, 20 can be selectively removed to create an opening 30, as shown particularly in FIGS. 7 and 8, for receiving a conduit (not shown) of either of two sizes which is suitably connected to either a side wall 14 or to the back wall 16 for passage of electrical wires (not shown) therethrough.

The first and second knockouts 26, 28 of the first and second knockout structures 18, 20 are respectively defined by areas of weakness along first and second substantially circular punch lines 32, 34. The first punch line 32 is completely contained within and spaced from the second punch line 34. The first punch line 32 of the first knockout 26 of the knockout structures 18, 20 preferably has a first diameter for accepting one-half inch trade size conduit. The second punch line 34 of the second knockout 28 of each first knockout structure 18 preferably has a second diameter for accepting three-quarters of an inch trade size conduit. The openings 30 created upon removal of the first and second knockouts 26, 28 along the first and second punch lines 32, 34 are for conduits with trade size diameters of about one-half inch and three-quarter of an inch, respectively.

The second knockout 28 of each first knockout structure 18 further has regions of maximum width 36 and regions of minimum width 38 angularly spaced from each other on opposite sides of the first knockout 26 and along a diameter of the second knockout 28. The region of maximum width 36 preferably has a width at least twice that of the region of minimum width 38 of the second knockout 28. Furthermore, the first knockout 26 has a first bridge member 40 which interrupts the first punch line 32 and constitutes the sole junction between the first knockout 26 and the second knockout 28 in each first knockout structure 18 and constitutes the sole junction between the first knockout 26 and each of the walls 14, 16 of the housing 22 in each second knockout structure 20. The second knockout 28 has a second bridge member 42 which interrupts the second punch line 34 and constitutes the sole junction between the second knockout 28 and each of the walls 14, 16 of the housing 22 in each first knockout structure 18. The first bridge member 40 is disposed outwardly either within the region of maximum width 36 of the second knockout 28 or into the interior region of the back wall 16 on those first knockouts 26 located on the back wall 16 and is disposed inwardly along the diameter of the first punch line 32 on those first knockouts 26 located on the side walls 14. The second bridge member 42 is disposed inwardly within the region of maximum width 36 of the second knockout 28 on those second knockouts 28 located on the back wall 16 and is disposed outwardly into the interior region of each side wall 14 on those second knockouts 28 located on the side walls 14. The second knockout 28 further has a pair of pseudo-bridge members 44 disposed adjacent to the regions of minimum width 38 of the second knockouts 28 and which do not interrupt the second punch line 34. The bridge members 40, 42, 44 help retain the first and second knockouts 26, 28 on the walls 14, 16 so as to prevent premature removal thereof. The pseudo-bridge members 44 and the second bridge members 42 combine to provide the second knockout 28 with greater retention strength than the single first bridge member 40 provides for the first knockout 26 and thereby provide support for the second knockout 28 when a one-half inch trade size opening 30 is created upon the removal of the first knockout 26.

Referring now to FIGS. 1 and 6, the housing 22 also has a plurality of spaced apart coplanar mounting ears 46 attached to the forward edges 14C of a pair of opposing side walls 14 of the plurality thereof. The mounting ears 46 are disposed adjacent to the opposite ends of the opposing side walls 14 so that they do not bridge corners 48 formed on the box 10 by adjacent ones of the side walls 14. The mounting ears 46 also extend from the respective side walls 14 in substantially perpendicular relation to the respective forward edges 14C thereof and toward one another lying substantially in the same plane as each other. Although, the mounting ears 46 are shown lying in the same plane as the front housing opening 24, the mounting ears 46 may be located at a different elevation, such as at a recessed location. Each mounting ear 46 preferably has an interiorly threaded aperture 50 for receiving a screw (not shown) therethrough, or a hole sized for receiving a self-tapping screw, for fastening a variety of different cover plates 52, such as the one example shown in FIG. 6, to the housing 22. The mounting ears 46 preferably are four in number with two mounting ears 46 spaced apart closer to the ends of each forward edge 14C of each of the pair of opposite side walls 14 than to one another. Furthermore, the apertures 50 of the mounting ears 46 are symmetrical about two axes that intersect one another.

More specifically, as seen in FIG. 1, the mounting ears 46 are arranged on the side walls 14 so as to position their respective apertures 50 such that one diagonally opposite pair (such as the mounting ear aperture in the upper righthand corner and the mounting ear aperture in the lower lefthand corner) are symmetrical about a first imaginary axis passing through the other diagonally opposite pair (such as the mounting ear aperture in the upper lefthand corner and the mounting ear aperture in the lower righthand corner) whereas the other diagonally opposite pair (such as the mounting ear aperture in the upper lefthand corner and the mounting ear aperture in the lower righthand corner) are symmetrical about a second imaginary axis passing through the one diagonally opposite pair (such as the mounting ear aperture in the upper righthand corner and the mounting ear aperture in the lower lefthand corner). This symmetrical arrangement of the respective mounting apertures 50 of the four mounting ears 46 about the first and second imaginary axes provide for proper alignment of the four corresponding mounting holes/slots 54 of cover plate 52 without regard to the specific orientation of the cover plate 52. Thus, all four mounting ear apertures 50 of the housing 22 can be used in any orientation of the cover plate 52 for attaching the cover plate to the housing in thereby providing for the mounting of dynamic loads, such as ceiling fans, to the cover plate 52.

Attaching the cover plate 52 to the housing 22 in four locations provides the necessary balance to prevent a degree of wobbling which would flex and break the mounting ears 46 of the housing 22 of the electrical box 10.

Referring now to FIGS. 1 to 8, in conclusion, the four and one-quarter inch per side wall 14 dimension of the housing 22 of the electrical junction box 10 allows the necessary space and clearance for two three-quarters of an inch trade size second knockouts 28 and one one-half inch trade size first knockout 26. This four and one-quarter inch per side wall 14 dimension is the smallest practical size for this knockout arrangement 12. The two industry standard sizes for electrical boxes 10 are the four inch and the four and eleven-sixteenths inch per side wall. The four inch side wall dimension does not provide enough space and clearance for the knockout arrangement 12 of the present invention. The four and eleven-sixteenths inch per side wall dimension does provide enough space and clearance for the knockout arrangement 12 of the present invention but a smaller dimensioned electrical box 10 is often desired and so the present invention provides an efficient compromise between the two industry standard sizes of electrical boxes 10 and maximizes the conduit pattern choices thereon so that only one box 10 need be manufactured to provide conduit pattern options which would otherwise require six different boxes to be made therefor, three of the smaller box 10 and three of the larger box 10, each having one combination of either (1) three one-half inch trade size knockouts, (2) two three-quarter of an inch trade size knockouts, and (3) one three-quarter of an inch trade size knockout and two one-half inch trade size knockouts.

Furthermore, the electrical junction boxes 10 are generally mounted entirely behind a drywall. The raised portion of the cover plate 52 generally projects through the drywall. The raised portion of the cover plate 52 which projects through the drywall is exactly the same for all of the boxes 10 irrespective of the dimension of the side walls 14 thereof. The size of the hole required in the plasterboard is therefore identical for each type of cover plate 52 regardless of the size of the box 10. Thus, the new four and one-quarter inch per side wall 14 dimension of the present invention does not alter the installation process of the electrical junction box 10. Furthermore, the manufacture of new cover plates 52 is not necessary with the present invention because the mounting ear apertures 50 are dimensioned in a four inch by four inch arrangement on the housing 22 and existing cover plates 52 of the four and eleven-sixteenths inch by four and eleven-sixteenths inch size can be modified by adding the four inch by four inch mounting hole arrangement. The electrical junction boxes 10 may also be made either one and one-half inches or two and one-half inches deep or otherwise as desired by the industry.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

What is claimed is:

1. An electrical junction box defined by a back wall having four planar side walls connected to and extending outwardly from said back wall and a knockout arrangement on at least one of said side walls for accepting two different diameter size conduits, said knockout arrangement comprising:

(a) a pair of first knockout structures being spaced apart along said at least one side wall, each of said first knockout structures including a first circular knockout and a second annular knockout completely surrounding said first circular knockout and having regions of maximum and minimum width angularly spaced from each other on opposite sides of said first knockout along a diameter of said second knockout, said first and second knockouts having centers spaced apart such that said second knockout is defined in an eccentric relation to said first knockout whereby each of said first and second knockouts can be selectively removed to create an opening for accepting a conduit of either of said two different diameter size conduits; and (b) a second knockout structure disposed on said at least one side wall and being spaced from said first knockout structures and containing only said first knockout;

(c) said first and second knockouts of said first and second knockout structures are respectively defined by areas of weakness along first and second substantially circular punch lines, said first punch line being completely contained within and spaced from said second punch line;

(d) said first knockout including a first bridge member interrupting said first punch line and constituting the sole junction between said first knockout and said second knockout, said first bridge being disposed within said region of maximum width of said second knockout;

(e) said second knockout including a second bridge member interrupting said second punch line and a pair of pseudo-bridge members which do not interrupt said second punch line, said second bridge being disposed within said region of maximum width of said second knockout and said pair of pseudo-bridge members being disposed within said region of minimum width of said second knockout;

(f) said second bridge member and said pair of pseudo-bridge members constituting a junction between said second knockout and said at least one side wall and providing a first retention strength greater than a second retention strength provided by said first bridge member for said first knockout such that said first knockout can be removed from said second knockout without said second knockout being removed from said at least one side wall.

2. The junction box as recited in claim 1, wherein said first knockout of said first and second knockout structures has a first size diameter to accept one-half inch size conduit;

said second knockout of each of said first knockout structures has a second size diameter to accept three-quarter of an inch size conduit; and each of said four side walls has a length of about four and a quarter inches.

3. The junction box as recited in claim 2, wherein said four side walls include two pairs of opposing side walls with each wall of said pairs of opposing side walls being spaced apart and facing toward one another, each of said opposing side walls of said pairs of said opposing side walls having a pair of spaced mounting ears with mounting apertures therein for attaching a cover plate to said junction box such that the attached cover plate will be able to withstand dynamic loads generated by a ceiling fan mounted on said cover plate, said pairs of mounting apertures lying in a common plane, are diagonally opposite and so arranged with one another such that one pair of said diagonally opposite mounting apertures are symmetrical about a first imaginary axis passing through the other pair of said diagonally opposite mounting apertures and such that said other pair of said diagonally opposite mounting apertures are symmetrical about a second imaginary axis passing through said one pair of said diagonally opposite mounting apertures whereby said cover plate having four corresponding mounting holes will align with said mounting apertures without regards to the specific orientation of said cover plate.

4. The junction box as recited in claim 3, wherein each of said mounting ears extend in substantially perpendicular relation to a respective one of said opposing side walls of said pair.

5. The junction box as recited in claim 1, wherein said region of maximum width has a width at least twice that of said region of minimum width of said second knockout.

\* \* \* \* \*